United States Patent [19]

Ichimaru

[11] Patent Number: 4,621,656
[45] Date of Patent: Nov. 11, 1986

[54] PISTON OPERATED VALVE

[75] Inventor: Tuneichi Ichimaru, Kurume, Japan

[73] Assignee: Ichimarugiken Co., Ltd., Fukuoka, Japan

[21] Appl. No.: 403,492

[22] PCT Filed: Apr. 10, 1981

[86] PCT No.: PCT/JP81/00087
§ 371 Date: Jul. 13, 1982
§ 102(e) Date: Jul. 13, 1982

[87] PCT Pub. No.: WO82/03672
PCT Pub. Date: Oct. 28, 1982

[51] Int. Cl.$^4$ .................. F16K 11/044; F16K 1/44
[52] U.S. Cl. .................. 137/625.66; 137/625.27; 137/242; 251/368; 251/63.6
[58] Field of Search .......... 137/625.5, 625.66, 625.27, 137/242; 251/368, 63.6

[56] References Cited

U.S. PATENT DOCUMENTS

| | | | |
|---|---|---|---|
| 1,623,557 | 4/1927 | Rybeck | 137/625.27 |
| 2,123,814 | 7/1938 | Summers | 137/625.27 |
| 2,907,345 | 10/1959 | Randall | 137/625.27 X |
| 3,188,048 | 6/1965 | Sutherland et al. | 251/63.6 |
| 3,382,894 | 5/1968 | Shurtleff et al. | 137/625.5 |
| 3,570,541 | 3/1971 | Franz | 137/625.66 |
| 3,983,900 | 10/1976 | Airhart | 251/368 X |
| 4,074,700 | 2/1978 | Engle | 137/625.27 |

Primary Examiner—Arnold Rosenthal
Attorney, Agent, or Firm—Robert E. Burns; Emmanuel J. Lobato; Bruce L. Adams

[57] ABSTRACT

A piston operated valve utilizes a piston which is driven by high pressure air to open or close the valve. The valve includes valve body portions (7, 8) which are formed of carbon fibre containing fluorocarbon resin, and which are detachably mounted on a valve rod (6). Where the valve is used in a duct system which passes a fluid such as a hot steam, the materials chosen provide a high degree of sealing performance, durability, heat and pressure resistance. The detachable mounting of the valve body facilitates the maintenance.

8 Claims, 5 Drawing Figures

PISTON OPERATED VALVE

TECHNICAL FIELD

The invention relates to a valve for use in a duct system for fluid such as hot steam or hot water, and more particularly, to a piston operated valve which utilizes a piston, driven by high pressure air, as means for opening or closing the valve.

BACKGROUND OF THE INVENTION

For use in a duct system installed in a vulcanizing plant or a record disc press machine through which hot steam passes, the considerations of saftey and operational reliability for a valve forbids the use of electrical valves which can be automatically opened and closed. A diaphragm or a piston operated valve which utilizes high pressure air operated actuating means is used in the duct system for fluid such as hot steam.

However, although a diaphragm operated valve is constructed to open or close the valve by driving a piston through a diaphragm which is formed of a flexible material such as synthetic rubber, the material of the diaphragm itself does not have a sufficient strength and durability, and this causes a damage thereof as a result of a degradation in the quality of the material over a prolonged period of use or the influence of mixtures contained in the high pressure air which is used to operate the valve. Any damage to the diaphragm may rapidly change the flow path, which disadvantageously may cause a serious accident due to the blowout of steam in a duct steam which utilizes the hot steam.

In the conventional construction, a diaphragm operated valve is used under the condition that the diaphragm and the piston are disposed in abutment against each other whenever the high pressure air is applied. Accordingly, there is a need to provide an operating clearance on the part of the diaphragm, resulting in a construction that the piston has a reduced surface area which is subject to the pressure while the diaphragm has an increased surface area which is subject to the pressure. As a consequence, the air pressure which is used to operate the valve is split into two portions, one acting upon the piston and the other upon the peripheral region of the diaphragm. This leads to the difficulty that a valve loading which has a great influence upon the isolating and sealing characteristic of the valve cannot be simply determined by a calculation based on the air pressure and the surface area of the piston which is subject to the pressure.

To avoid these disadvantages of the diaphragm operated valve concerning the safety and the isolation/sealing characteristic which occur when it is used in a hot steam duct system, there has been a proposal to substitute a piston operated valve for the diaphragm operated valve. Since it does not include any structure such as a diaphragm which may be damaged, a piston operated valve can assure a high safety. In addition, since only the piston is subject to the high air pressure, the valve loading can be precalculated to enable a high degree of isolation/sealing characteristic to be assured, thus making such valve preferred for use in a duct system which utilizes hot steam or the like.

However, a piston operated valve found in the prior art comprises a valve body which is formed of a metal material. Hence, a metal seal must be used which is known to present a difficulty in forming suitable sealing surfaces, resulting in a degraded sealing performance. In addition, the valve body must be frequently changed because of its abrasion.

To provide an improvement in the conventional piston operated valves, Japanese Laid-Open Utility Model Application No. 55-105666 proposes a piston operated valve in which a valve body is formed of a fluorocarbon resin rather than metal. As is recognized, a fluorocarbon resin has a degree of elasticity, and permits a seal having an increased area of contact to be constructed, thus allowing a high sealing performance to be achieved. However, a reduced abrasion resistance represents a disadvantage of such valve, which cannot be used over a prolonged period of time. The reduced life of the valve body requires an increased maintenance labor.

Accordingly, it is an object of the invention to provide a piston operated valve having improved sealing characteristic and durability while eliminating the disadvantages of conventional piston operated valves.

It is another object of the invention to provide a piston operated valve having an improved heat and pressure resistance and which permits a facilitated replacement of valve body.

DISCLOSURE OF THE INVENTION

In accordance with the invention, an inlet port is formed in the top of a cylinder for receiving a high pressure air stream. A piston is disposed within the cylinder for vertical movement therein, with a spring extending between the lower surface of the piston and a yoke. A valve rod is connected to the piston, and an annular valve body which is formed of carbon fibre containing fluorocarbon resin is detachably mounted on the lower end of the valve rod. Bevelled seal surfaces are defined on the valve body and its cooperating valve seat. As a result of forming the valve body of the carbon fibre containing fluorocarbon resin, there is provided a piston operated valve having a good sealing performance, durability, heat and pressure resistance and which is preferred in particular for use in a hot fluid duct system.

According to another aspect of the invention, the bevelled seal surfaces formed on the valve body and the valve seat have an angle of inclination of 45°, thereby minimizing the abrasion while providing an optimized sealing performance.

BEST MANNER OF CARRYING OUT THE INVENTION

Figure 1:
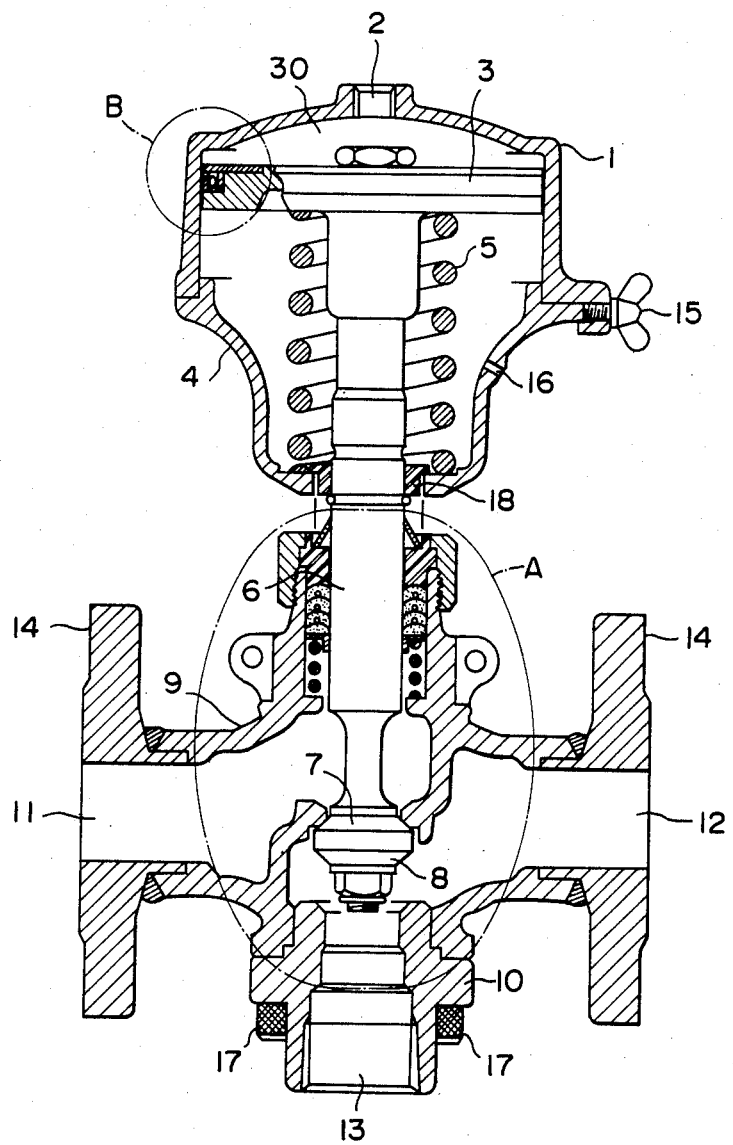
FIG. 1 is a longitudinal section of a piston operated valve according to an embodiment of the invention.

Referring to the drawings, the piston operated valve of the invention will hereinafter be described. An inlet port 2 for receiving a high pressure air stream is formed in the top of an inverted generally U-shaped cylinder, and a piston 3 is disposed therein for vertical movement.

A spring 5 is disposed between the lower surface of the piston 3 and the bottom portion of a generally U-shaped casing 4. A valve rod 6 is connected to the piston 3, and a valve body having a pair of annular portions 7, 8 is detachably mounted on the lower end of the valve rod 6. The valve body portions 7, 8 are formed of a carbon fibre containing fluorocarbon resin. Bevelled seal surfaces 7a, 8a are formed on the valve body portions 7, 8 for cooperation with corresponding valve seats 9a, 10a which are also formed by bevelled surfaces.

The piston operated valve shown represents a three way valve, and includes a main body 9 and a valve seat flange 10 in which an inlet passage 11, an outlet passage 12 and a drain passage 13 are formed. The valve seats 9a, 10a are formed in a region where the passages 11 to 13 merge together, and a flow path is switched by a downward movement of the valve rod 6 and the valve body portions 7, 8 in response to the downward movement of the piston 3 which is caused by an in-flow of the high pressure air into the cylinder, and by an upward movement of the valve rod 6 and the valve body portions 7, 8 in response to an upward movement of the piston 3 which occurs under the resilience of the spring 5 when the supply of the high pressure air is interrupted.

In FIG. 1, numerals 14 represent flanges for connection with a piping, 15 a threaded bolt which is used to connect the cylinder 1 and the casing 4 together, 16 an air vent hole, 17 a bolt which is used to secure the flange 10 of the valve seat, and 18 a guide bushing.

Figure 2:
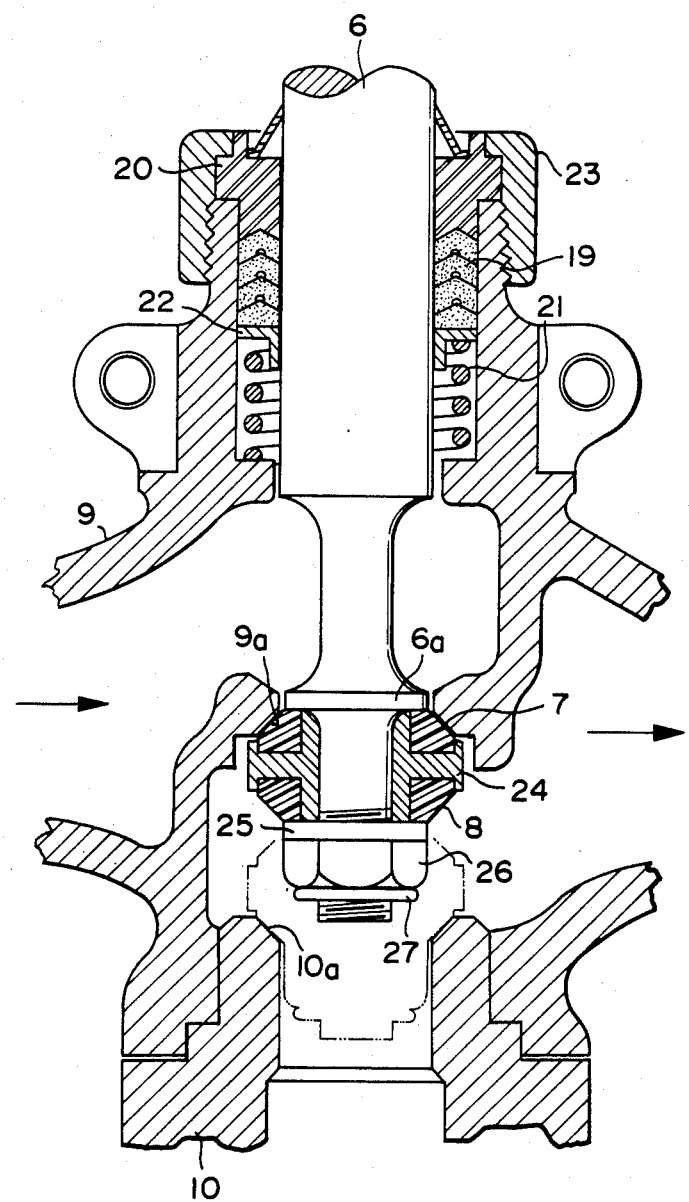
FIG. 2 is an enlarged view of an encircled region A shown in FIG. 1.

Referring to FIG. 2, a construction for switching a flow path will be specifically described. The valve body portions 7, 8 are formed of a fluorocarbon resin, containing carbon fibres having lengths equal to or greater than 5 microns. In one embodiment, the content of carbon fibres is equal to 25%, but any suitable content may be used depending on the lengths and durability of the carbon fibres. The term "fluorocarbon resin" as used herein refers to a resin which is produced by polymerization of monomers in which one or more of of hydrogen atoms of ethylene are substituted by flourine atoms. The elasticity of the fluorocarbon resin secures a satisfactory sealing performance, and the presence of carbon fibres therein considerably improves the abrasion resistance and also improves the heat and pressure resistance, thus providing an optimized choice of material for the valve body.

As mentioned previously, the valve body portions 7, 8 are formed with bevelled sealing surfaces 7a, 8a for cooperation with bevelled surfaces of the valve seats 9a, 10a, the angle of inclination of which conforms to the angle of inclination of the sealing surfaces. During the time the valve body portions 7, 8 are molded, they may be shaped into right-angle triangles in section, thereby automatically producing the sealing surfaces 7a, 8a. The bevelled surface seal minimizes the abrasion while assuring a satisfactory sealing performance. In the example shown, the angle of inclination of the bevelled surfaces is chosen to be 45°, which is convenient for its manufacture and which minimizes the abrasion while affording the best sealing performance.

With continued reference to FIG. 2, a construction to seal the valve rod will now be described. As shown, the arrangement includes gaskets 19 interposed between the valve rod 6 and the main body 9 in a stack defined between a gland 20 and a bias spring 21, with a ring 22 interposed between the spring 21 and the lowermost gasket 19 for bearing engagement with the peripheral surface of the valve rod 6 with its inner surface in order to remove any deposition thereon. In this manner, the valve rod 6 is positively sealed as a result of the gaskets 19 being biased by the spring 21. Any deposition adhering to the peripheral surface of the valve rod 6 is removed by the ring 22, thus preventing any damage which might be caused to the gaskets 19 by the deposition. In this manner, the valve rod 6 is maintained in a properly sealed condition for a prolonged period of use. It will be noted that the gland 20 is secured in place by a nut 23.

Figure 3:
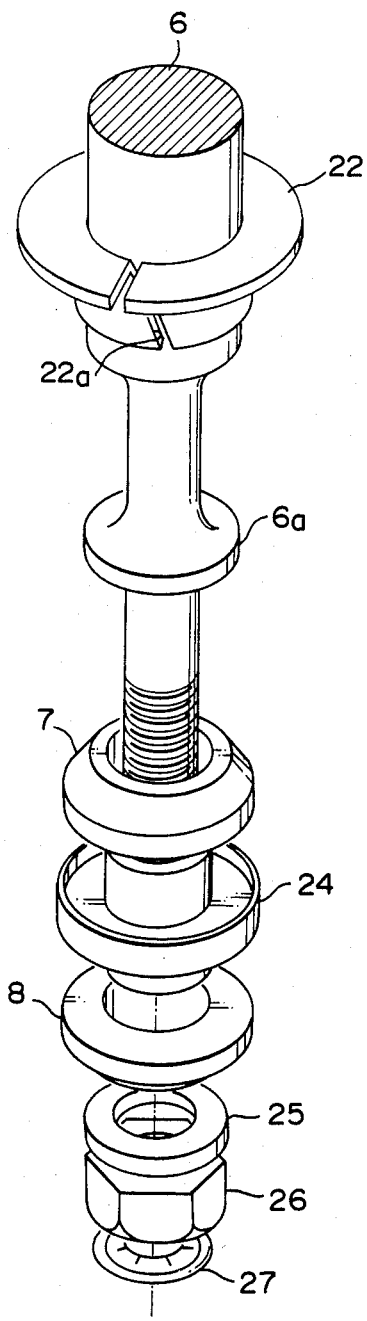
FIG. 3 is a perspective view illustrating the construction of a mechanism which permits a detachable mounting of the valve body of the piston operated valve shown in FIGS. 1 and 2.

Referring to FIG. 3, the manner of detachably mounting the valve body portions 7, 8 will be described. As shown, the valve body portions 7, 8 are mounted on an annular holding frame 24 which is fitted over the valve rod 6. The valve rod 6 is formed with a step portion 6a, against which the upper valve body portion 7 is disposed. A washer 25 engages the lower valve body portion 8 and is threadably engaged by a nut 26. In this manner, by merely turning and removing the nut 26, the valve body portions 7, 8 can be changed. It should be understood that a number of constructions are contemplated which permit a detachable mounting of the valve body portions 7, 8, and may be used in place of the construction shown. In FIG. 3, numeral 27 represents a locking member associated with the nut 26 to prevent the latter from loosening, and reference character 22a represents a skewed notch formed in the ring 22.

Figure 4:
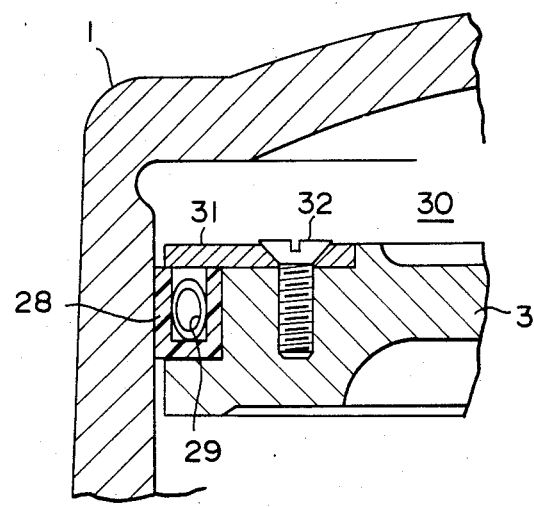
FIG. 4 is an enlarged view of an encircled region B shown in FIG. 1.
Figure 5:
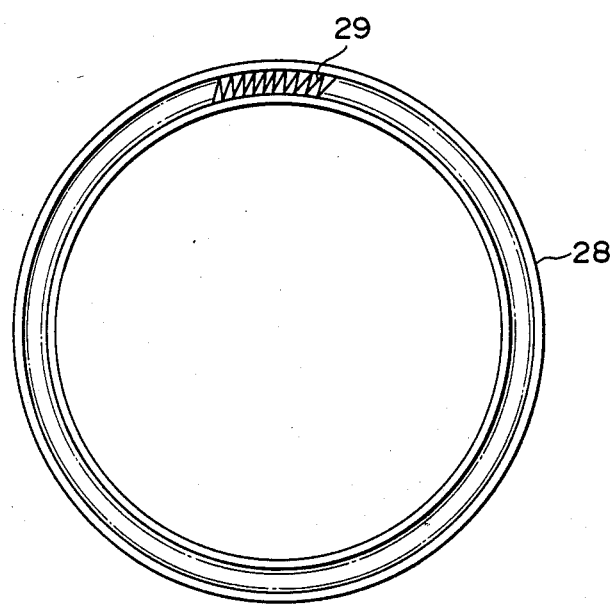
FIG. 5 is a plan view of a piston seal ring of the piston operated valve.

FIGS. 4 and 5 show a piston ring construction, which comprises a piston ring 28 formed of a fluorocarbon resin and having a U-shaped construction, and a coiled spring 29 which is received in the U-shaped recess of the ring 28. As shown in FIG. 5, the coiled spring 29 is disposed at an angle, which is effective to impart the sidewall of the piston ring 28 with a force tending to expand and which changes little with respect to an outer pressure. As shown in FIG. 4, the U-shaped opening of the piston ring 28 faces a plenum chamber 30, thus allowing the sealing response to be dependent on the pressure. Specifically, the elasticity produced by the material of the piston ring 28 in combination with the expanding force and the corresponding sealing effect achieves a positive seal between the inner wall of the cylinder 1 and the piston ring 28 with a pressure contact which does not interfere with the vertical movement of the piston 3. In FIG. 4, a retainer plate 31 secures the piston ring 28 in position, and is in turn secured in place by a threaded bolt 32.

USE IN THE INDUSTRY

As discussed above, the piston operated valve of the invention is suitable for use, in particular, in a duct system utilizing hot steam, such as in a tire vulcanizing plant or a record disc pressing machine, and provides a high degree of safety and sealing performance as well as excellent durability, heat and pressure resistance while facilitating the maintenance.

What is claimed is:

1. A piston-operated valve comprising: a main body having an inlet port and two outlet ports all in fluid communication with one another within the interior of the main body, and having a pair of spaced apart annular valve seats; a valve body disposed within the main body for movement between a first position in which the valve body engages one valve seat thereby closing the inlet port and providing fluid communication between the two outlet ports and a second position in which the valve body engages the other valve seat thereby closing one outlet port and providing fluid communication between the inlet port and the other outlet port, the valve body comprising a pair of annular valve body portions composed of carbon fiber-containing fluorocarbon resin each sealingly engageable with corresponding ones of the two valve seats depending on whether the valve body is in the first or second position; a cylinder having an inlet opening for admitting therethrough pressurized fluid; a piston reciprocably mounted in the cylinder for movement in opposite directions; a piston rod connected to the piston for movement therewith and slidably extending out of the cylinder into the main body; a plurality of sealing gaskets stacked one atop another and interposed between the piston rod and the main body; a biasing spring disposed within the main body and encircling the piston rod for exerting a biasing force on the stacked gaskets effective to urge the gaskets into sliding sealing engagement with the piston rod; means for detachably connecting the valve body to the piston rod for movement therewith in response to movement of the piston thereby enabling detachment and individual replacement of the valve body portions, the means for detachably connecting the valve body to the piston rod comprising a step portion formed on the piston rod, an annular frame member removably inserted on the piston rod and having opposed annular surfaces on which are seated respective ones of the annular valve body portions, and displaceable tightening means removably connected to the piston rod and displaceable therealong for axially tightening the serial arrangement of the valve body portion-frame member-valve body portion against the piston rod step portion; and biasing means disposed within the cylinder for resiliently biasing the piston in one direction to position and maintain the valve body in the first position when pressurized fluid is not admitted through the cylinder inlet opening and for permitting movement of the piston in the other direction to position and maintain the valve body in the second position when pressurized fluid is admitted through the cylinder inlet opening.

2. A piston-operated valve according to claim 1; wherein the displaceable tightening means comprises threads on the piston rod, and a nut threadedly connected to the piston rod threads.

3. A piston-operated valve according to claim 1; wherein the valve body portions and the valve seats have cooperating bevelled sealing surfaces.

4. A piston-operated valve according to claim 3; wherein the bevelled sealing surfaces have an angle of inclination of 45°.

5. A piston-operated valve according to claim 3; wherein the carbon fiber content of the carbon fiber-containing fluorocarbon resin is about 25%.

6. A piston-operated valve according to claim 4; wherein the carbon fiber content of the carbon fiber-containing fluorocarbon resin is about 25%.

7. A piston-operated valve according to claim 1; wherein the carbon fiber content of the carbon fiber-containing fluorocarbon resin is about 25%.

8. A piston-operated valve according to claim 1; including a ring interposed between the biasing spring and the stacked gaskets, the ring slidably engaging with the piston rod to effect removal of particles adhering to the piston rod during the course of use of the piston-operated valve.

* * * * *